G. H. MELLON AND W. R. SMITH.
CASKET.
APPLICATION FILED JUNE 26, 1917.
1,364,780.
Patented Jan. 4, 1921.
2 SHEETS—SHEET 1.
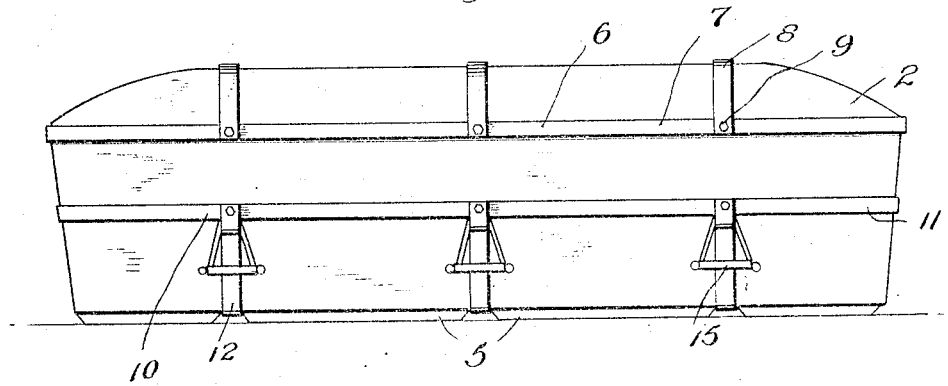
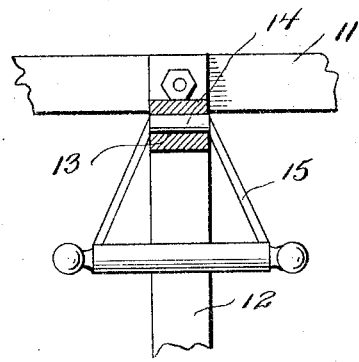
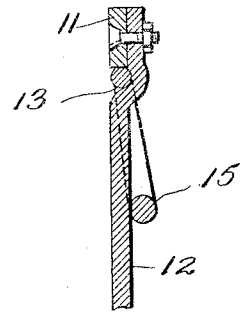
INVENTOR
George H. Mellon.
William R. Smith.
BY Victor J. Evans
ATTORNEY G. H. MELLON AND W. R. SMITH.
CASKET.
APPLICATION FILED JUNE 26, 1917.
1,364,780.
Patented Jan. 4, 1921.
2 SHEETS—SHEET 2.
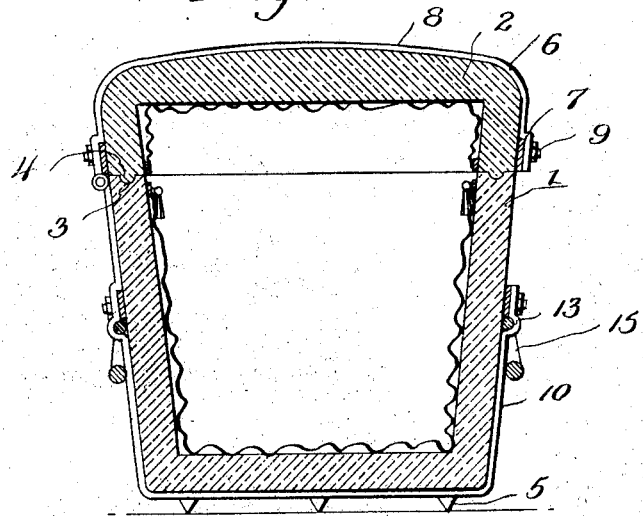
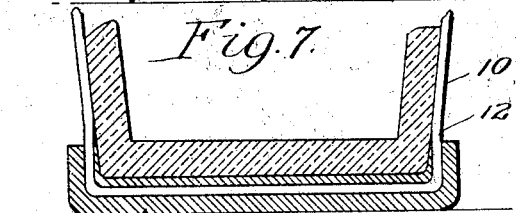
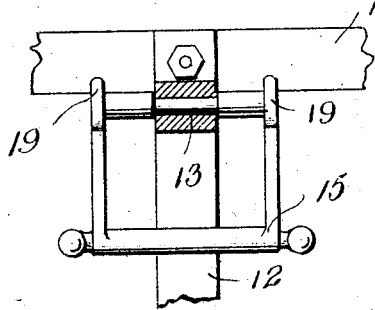
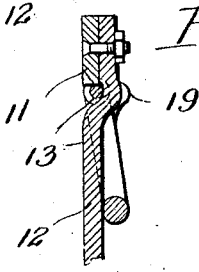
INVENTOR
George H. Mellon
William R. Smith.
BY Victor J. Evans
ATTORNEY

UNITED STATES PATENT OFFICE.

GEORGE H. MELLON AND WILLIAM R. SMITH, OF PITTSBURGH, PENNSYLVANIA; SAID SMITH ASSIGNOR TO SAID MELLON; F. A. VICKREY ADMINISTRATOR OF SAID GEORGE H. MELLON, DECEASED.

CASKET.

1,364,780.                    Specification of Letters Patent.           Patented Jan. 4, 1921.

Application filed June 26, 1917. Serial No. 177,099.

*To all whom it may concern:*

Be it known that we, GEORGE H. MELLON and WILLIAM R. SMITH, citizens of the United States, residing at Pittsburgh, in the county of Allegheny and State of Pennsylvania, have invented new and useful Improvements in Caskets, of which the following is a specification.

This invention relates to an improved form of casket in which the casket proper is formed of a vitreous material such as glass which is reinforced throughout by supporting frames.

The primary object of the invention is to accomplish the foregoing result in such a manner that it is not necessary to form depressions in the glass or bore holes therethrough.

Another object of the invention is to simplify the construction and association of the parts of the frame so that the expense thereof may be materially reduced and in such a manner that the frames will have the required strength.

Besides the above our invention is distinguished in the manner of forming the body frame so that the same may be permanently secured thereto or readily removed, but when in place effectively held against slipping.

A very important feature of our invention is the novel manner of associating the handles with the frame so that the handles may be readily connected to the frame during the assemblage thereof, and cause a reduction of the number of bolts or securing elements necessary in the assembling of the frame.

With these and other objects in view the invention will be better understood from the following detail description taken in connection with the accompanying drawings wherein:

Figure 1 is a side elevation of our improved form of casket.

Fig. 2 is a cross sectional view thereof.

Figs. 3 and 4 are detail views of one form of handle.

Figs. 5 and 6 are detail views of another form of handle.

Figs. 7 and 8 are detail views of a shock absorber.

Again referring to the drawings, the numeral 1 designates the body of the casket and the numeral 2 the lid therefor, the former having a groove 3 extending around its upper edge, and the latter having a correspondingly shaped rib "4" adapted to fit within the groove when the latter is in place. Thus it will be seen that when glass cement or other cementitious material is arranged between the groove and rib, the casket will be hermetically sealed for preserving the contents of the casket. The bottom of the body 1 is formed with a series of ribs 5 which, besides reinforcing the bottom of the casket to take care of excessive shocks, has an additional advantage to be described later.

The lid is embraced by a frame 6, consisting of a longitudinal extending band 7 passing around the lid, and a series of transverse bands 8 passing over the lid and secured to the longitudinal band by the securing elements 9, which may be rivets or bolts. The frame 10 of the body consists of a longitudinal band 11 passing around the body and transverse bands 12 passing under the body in such a manner that they coöperate with the ribs 5 to prevent longitudinal movement of the bands 12 upon the casket. Thus it will be seen that it is not necessary to make the band 11 continuous and, besides, this construction allows the frame of the body to be readily slipped from the body in case it is desired to have a removable frame instead of one permanently secured to the casket.

Each transverse band 12 is riveted or bolted at its ends to the longitudinal band and formed directly below the longitudinal band with depressions 13 to receive the circular portion 14 of the handles 15. As clearly shown in Fig. 4, it will be seen that the handles are directly mounted under the longitudinal band, so that the longitudinal bands as well as transverse bands will take up the strain.

So far as we have proceeded, in a very inexpensive manner and with a minimum number of parts, we are able to reinforce the casket and carry the same from place without the necessity of boring holes in the casket or changing the symmetry thereof.

In Figs. 5 and 6 we have shown a modified form of handle identical with that just described, with the exception that each handle is formed with lugs 19 adapted to engage the longitudinal band when the handle is in horizontal position, so that the same may not pass this position.

Should it be found advisable in practice, that portion of each of the bands 12 passing over the casket may have arranged thereon shock absorbers 22, which may simply consist of tubes of rubber or other resilient material slipped onto the band with a portion arranged beyond the ribs 5.

Having described our invention, what we claim is:

1. In combination, a casket having spaced sets of ribs on the bottom thereof, a frame for the casket consisting of a longitudinal band and transverse bands having their ends fixed to the longitudinal band and passing under the casket between said sets of ribs and shock absorbing elements arranged upon the transverse bands and arranged in the spaces between said sets of ribs for the purpose set forth.

2. A casket frame consisting of a longitudinal band, transverse bands each of U shape formation, with the ends connected to the longitudinal band and further formed with arcuate depressions directly under the longitudinal band, handles supported in said depressions and engaging the under surface of the longitudinal band and sleeves of resilient material engaging the horizontal portion of each transverse band.

3. A casket frame consisting of a longitudinal band, transverse bands of U shape having their ends connected with the longitudinal band and further provided with depressions directly under the longitudinal band, handles supported in said depressions, stop lugs on the handles engaging with the longitudinal band to limit the upward movement of the handles and sleeves of resilient material on the horizontal portions of said transverse bands.

In testimony whereof we affix our signatures.

GEORGE H. MELLON.
WM. R. SMITH.